United States Patent
Ramos et al.

(10) Patent No.: US 11,880,318 B2
(45) Date of Patent: Jan. 23, 2024

(54) LOCAL PAGE WRITES VIA PRE-STAGING BUFFERS FOR RESILIENT BUFFER POOL EXTENSIONS

(71) Applicant: Microsoft Technology Licensing, LLC, Redmond, WA (US)

(72) Inventors: Rogério Ramos, Redmond, WA (US); Kareem Aladdin Golaub, Seattle, WA (US); Chaitanya Gottipati, Hyderabad (IN); Alejandro Hernandez Saenz, Kirkland, WA (US); Raj Kripal Danday, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/705,981

(22) Filed: Mar. 28, 2022

(65) Prior Publication Data

US 2023/0140121 A1    May 4, 2023

Related U.S. Application Data

(60) Provisional application No. 63/273,304, filed on Oct. 29, 2021.

(51) Int. Cl.
*G06F 13/16*    (2006.01)
(52) U.S. Cl.
CPC .............................. *G06F 13/1673* (2013.01)
(58) Field of Classification Search
None
See application file for complete search history.

(56) References Cited

U.S. PATENT DOCUMENTS

| | | | |
|---|---|---|---|
| 10,210,109 B2 * | 2/2019 | Kubala | G06F 3/0604 |
| 10,922,159 B2 * | 2/2021 | Reed | G06F 11/0778 |
| 2013/0151786 A1 * | 6/2013 | Huras | G06F 12/0891 |
| | | | 711/135 |

(Continued)

FOREIGN PATENT DOCUMENTS

EP    2590086 A1    5/2013

OTHER PUBLICATIONS

"International Search Report and Written Opinion Issued in PCT Application No. PCT/US22/041615", dated Dec. 1, 2022, 10 Pages.

*Primary Examiner* — Elias Mamo
(74) *Attorney, Agent, or Firm* — Weaver IP L.L.C.

(57) ABSTRACT

Methods for local page writes via pre-staging buffers for resilient buffer pool extensions are performed by computing systems. Compute nodes in database systems insert, update, and query data pages maintained in storage nodes. Data pages cached locally by compute node buffer pools are provided to buffer pool extensions on local disks as pre-copies via staging buffers that store data pages prior to local disk storage. Encryption of data pages occurs at the staging buffers, which allows a less restrictive update latching during the copy process, with page metadata being updated in buffer pool extensions page tables with in-progress states indicating it is not yet written to local disk. When stage buffers are filled, data pages are written to buffer pool extensions and metadata is updated in page tables to indicate available/valid states. Data pages in staging buffers can be read and updated prior to writing to the local disk.

20 Claims, 5 Drawing Sheets

(56) References Cited

U.S. PATENT DOCUMENTS

| | | | |
|---|---|---|---|
| 2015/0149704 A1 | 5/2015 | Lee et al. | |
| 2018/0365141 A1* | 12/2018 | Dragojevic | G06F 11/1435 |
| 2019/0102087 A1 | 4/2019 | Shi et al. | |
| 2020/0057664 A1* | 2/2020 | Durham | G06F 21/53 |

* cited by examiner

LOCAL PAGE WRITES VIA PRE-STAGING BUFFERS FOR RESILIENT BUFFER POOL EXTENSIONS

CROSS-REFERENCE TO RELATED APPLICATION(S)

This application claims priority to U.S. Provisional Patent Application No. 63/273,304, entitled "LOCAL PAGE WRITES VIA PRE-STAGING BUFFERS FOR RESILIENT BUFFER POOL EXTENSIONS," and filed on Oct. 29, 2021, the entirety of which is incorporated by reference herein.

BACKGROUND

Compute nodes in large-scale database implementations are forced to flush data pages to permanent storage when a local buffer pool becomes full. Additionally, write transactions that modify data pages in the local buffer pool can cause the buffer pool to fill faster than data can be committed to permanent storage, and this causes significant delays and system performance degradation during transaction completion because the write transactions, the local buffer pool, and write locks are coupled in this process. Similarly, if pages in the local buffer pool have changes, i.e., the pages are dirty, these pages are evicted from the local buffer pool as it fills up. In such cases, pages are either evicted from memory, or must be updated which may trigger a flush of writes where each one requires its own exclusive latch, encryption of the data, writing of the data, decryption of the data, and unlatching of the page. Further, if shared latches are implemented, obtaining an exclusive latch requires draining all shared latches, and this further hinders system performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for local page writes via pre-staging buffers for resilient buffer pool extensions are performed by computing systems. Compute nodes and control nodes comprise portions of database systems that handle query planning and distribution or query functions for operations on data files maintained by page servers or storage nodes in data files. Compute nodes insert, update, and perform portions of queries on the data pages maintained in page servers/storage nodes. Data pages may be cached locally by compute nodes in buffer pools, and are provided to buffer pool extensions on local disks as pre-copies via staging buffers that store data pages prior to local disk storage. That is, staging buffers perform a pre-write storage that acts as an outlet for the buffer pool memories in order to relieve heavy writing activity. Encryption of data pages occurs at the staging buffers rather than in the buffer pool, which also allows a less restrictive update latching during the copy process, with page metadata being updated in buffer pool extensions page tables with in-progress states indicating the data page is not yet written to local disk through the buffer pool extensions. When stage buffers are filled, data pages are written to the buffer pool extensions and metadata is updated in page tables to indicate available/valid states when the writes to the buffer pool extensions complete. Data pages in staging buffers can be read and updated prior to writing to the local disk just as would data pages in the buffer pool extensions.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based at least on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
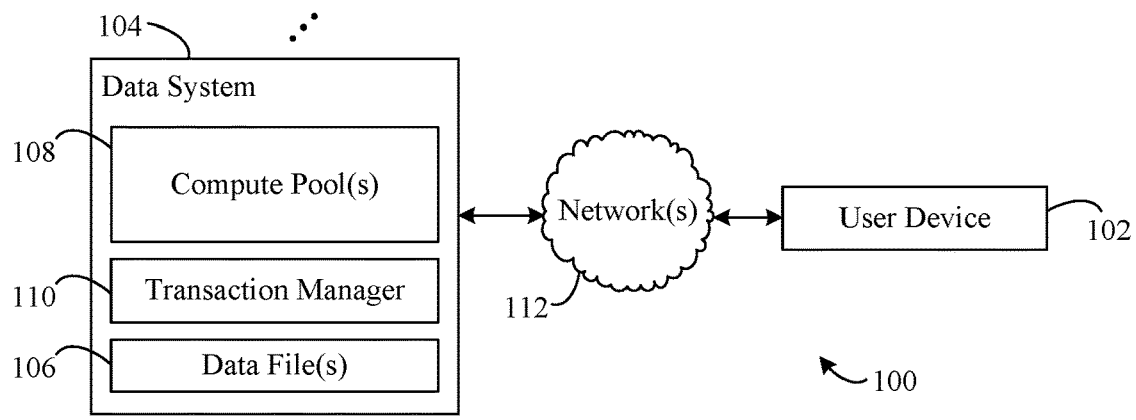
FIG. 1 shows a block diagram of a system for local page writes via pre-staging buffers for resilient buffer pool extensions, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

In the context of the embodiments herein, e.g., for databases, a "data set" or "data file" may be stored as a "table" of data, and these terms, "tables," "data sets," and "data files" may be used interchangeably in the description. Such terms are also contemplated as comprising databases, or portions thereof, in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for local page writes via pre-staging buffers for resilient buffer pool extensions. Section III below describes example computing devices that may be used to implement features of the embodiments described herein. Section IV below describes additional examples and advantages, and Section V provides some concluding remarks.

II. Example Embodiments for Local Page Writes via Pre-Staging Buffers for Resilient Buffer Pool Extensions Methods for local page writes via pre-staging buffers for resilient buffer pool extensions are performed by systems and devices. Various embodiments herein are directed to database systems, including distributed databases, and computing centers, which may be cloud-based, such as but not limited to, data warehouses, systems for "Big Data" analytics, enterprise systems, other database systems that store very data sets, including very large data sets, and/or the like, and while some embodiments are described in the context of compute nodes in distributed database implementations, embodiments are not so limited. Described embodiments are applicable to any type of database server implementation, such as but not limited to, SQL Server® from Microsoft Corporation of Redmond, WA. Additionally, embodiments are described for buffer pool memories and buffer pool extension memories for various implementations by way of example and for purposes of illustration, however, other implementations and architectures are also adaptable to the described techniques and are contemplated herein.

In embodiments, a distributed database system or a data warehouse system, by way of example, may comprise multiple compute pools (e.g., across multiple physical servers, as virtual data warehouse instances within a logical server, and/or the like). A compute pool may include, without limitation, a control node (i.e., a front end node), a distributed query processor (DQP), one or more compute nodes, and/or the like. Control nodes and associated DQPs may act as query endpoints that are responsible for producing a distributed plan for an incoming query and dividing work among a pool of compute nodes, where each compute node may be responsible for distributively processing data from one or more distributions, e.g., portions or distributions of a data set or data file, which may comprise a large, distributed table of data. Each control and compute node in the embodiments described may be configured to run/execute its own instance of a database server, each of which may be assigned a resource manager identifier unique to the overall system. In embodiments, an instance of a database server may comprise various ones of control and compute "nodes": a portion of a node(s), a node, more than one node, and/or the like.

In implementations, compute pools may share the same transaction manager node to start or commit a transaction. Additionally, queries are contemplated to be directed against a single, or multiple, databases (DBs), which may include writing across all databases within a logical server or physical servers that comprise the same transaction manager node. That is, cross-DB query support may be implicit in the described embodiments. Embodiments herein also contemplate that different compute pools are enabled to operate on the same tables of DBs within a system, where local storage of written data pages may be maintained by compute nodes for performance of functions against different DBs.

In a given system, the compute nodes may be responsible to insert, update, and/or query data of a database (also a data file, data set, etc.). In some embodiments, the data may be organized in 8-kilobyte data pages, or "pages" herein. The pages of a database are maintained in the storage nodes of the system, which may be page servers in embodiments. Compute nodes may cache some of these pages in memory, such as a buffer pool, and may also persist pages in local disks, such as solid state drives (SSDs) and/or the like. The compute nodes may utilize a buffer pool extension portion of memory for local storage of these pages, for instance, via a Resilient Buffer Pool Extension (RBPEX) as used for some implementations of SQL Server®. The buffer pool extension memory is a resilient storage, and may comprise a page file (or extension page file, or buffer pool extension page file, herein) in embodiments, such that upon a compute node process restart, the buffer pool extension memory is enabled to use the pages stored therein and avoid a more expensive network request to the storage nodes.

As the buffer pool of a compute node becomes full, some of its pages may be evicted. If those pages to be evicted have outstanding changes, e.g., they are "dirty," and they are also in the buffer pool extension, then either they need to be updated in disk or evicted from the permanent storage. In databases with intensive workloads, this causes a flush of local writes to the local disk which can degrade performance of the system. Additionally, "dirty" pages written from the buffer pool to the buffer pool extension are written one-at-a-time, unless the pages are contiguous for a batch write, because they are not stored contiguously in the local RBPEX file.

As an example of the above issues, for each one of these updating writes, the corresponding page needs an exclusive latch, needs to have its contents encrypted, and then, after the write completion, needs to have its contents decrypted and the page unlatched. In order to obtain the exclusive latch, all shared latches on a given page must be drained, and therefore it takes longer to obtain the exclusive latch as compared to an update latch which allows the presence of shared latches. Exclusive latches also restrict read operations which should be performed at a higher rate. These problems are more accentuated immediately after the buffer pool extension file is created and initialized which causes writes to be slower due a race condition that occurs with the initialization procedure responsible to grow the file to its final size. Still further, write in-place implementations require that an updated page in the buffer pool extension be rewritten at the same location which taxes the code path for writing to the file and causes excessive small write operations in random locations of the file.

The embodiments herein provide for methods and unique system memory architectures in which pages to be written to the buffer pool extension are first copied to an intermediate staging buffer. That is, local page writes are performed via pre-staging of the writes in the staging buffers prior to writing to the from the buffer pool. The staging buffers, as described herein, are configured to accommodate many data pages before the pages are written to the local disk for persistence. Additionally, the embodiments herein enable the encryption process to be performed at the staging buffers, and this allows a less restrictive update latch during the copy process rather than the exclusive latch described above in current solutions. Staging buffers also enable updates and new writes for data pages to be performed therein at a new, free location, and staging buffers herein are enabled to accumulate non-contiguous pages from the buffer pool which may then be written as a single batch write to the buffer pool extension.

It should be noted that the update latch may be required to be maintained until the page is copied completely and the metadata of the page is updated in the internal table of pages, or "page table," of the buffer pool extension. The page state is maintained in the table as "in-progress," or "in-flight," which indicates that the page is not yet written to disk (i.e., the page is currently stored in the staging buffer). In cases of a crash and recovery in the system, the "in-progress" or "in-flight" pages may be discarded to preserve the correctness of the system. When the staging buffers are filled during operations of various described embodiments, the data therein may be written to the local disk where it is persisted thereby, and another update in the buffer pool extension metadata tables will be made to change the page state to "valid" and/or "available" (or another indication that that write to disk is complete for the data).

While in the staging buffer, the pages may be evicted from the buffer pool in main memory, according to embodiments. At a later time after eviction from the buffer pool, pages may be needed again, and to this end, the described embodiments allow for such pages to be read from the staging buffer if they have not yet been written to the local disk via the buffer pool extension. Likewise, such data pages may also be updated in the staging buffer in cases where the pages got "dirty" in the buffer pool and a checkpoint or eviction is in progress and the pages in the staging buffer have not yet been written to the local disk via the buffer pool extension.

In embodiments, the staging buffers may operate as or embody segments that represent contiguous areas in the local file in the local memory where the data pages are persistently stored. Once a segment is full, it may be written to the local disk as a single, batched write operation, and the corresponding pages are marked as "valid" and/or "available" in the buffer pool extension metadata table. Then, a new segment may be chosen to receive the next, new data pages that are provided from the buffer pool, and thus, a new free contiguous area in the buffer pool extension file must be found. Pages that are updated will have their contents copied to the current staging buffer/segment buffer in memory. As such pages also have a previous location on disk associated with a different segment, the metadata file/table update detaches the page from the prior/old segment, and attaches the page to the new/current segment still being staged in memory. This may create holes in older segments stored on disk as pages move to more current segments, and a segment in which most of its pages moved to other segments may end up having a low occupancy.

Regarding low occupancy, each data page may have timestamp information associated therewith in the buffer pool extension metadata table, according to embodiments. As pages are used (e.g., read from, updated, written to, etc.), this timestamp is updated with a recent time. As pages stored in segments get their timestamp updated, the corresponding segment will update its timestamp with the highest value among its pages. Embodiments also provide for an eviction procedure that runs in the background for the system, e.g., in compute nodes, that is configured to identify segments used the least, e.g., segments have the lowest segment timestamp, and/or to identify segments with low occupancy. The pages in these identified segments may be evicted from the buffer pool extension metadata table causing the pages to detach from their respective segments. When a segment has zero pages associated with it, the segment may move to, or be designated/identified in, a list of free segments which can be picked up for new pages that are flushing into the buffer pool extension memory.

Pages in low-occupancy segments may also have a recent timestamp. To mitigate the effects of evicting these "hot," or frequently-used, pages of low occupancy segments, embodiments provide for attempting to write the contents of such pages to the most current open segment that is staging in memory. This may be performed quickly if the page is still in local memory, and may also be performed through a local disk read operation. In local disk read scenarios, these reads may be attempted on a best effort basis as local disk operations are slower than in-memory operations.

Therefore, embodiments herein enable systems such as distributed DB systems, data warehouse systems, and/or the like, to perform and track local write operations of data in ways that avoid efficiency degradation that occurs with exclusive latching for high-volume writes. Embodiments provide for utilization of in-memory database transactional tables for metadata to track if pages are in-flight or available, and pages are associated with segments using a lock-free mechanism that allows the pages to efficiently move from one segment to another. In-flight pages can be read and updated even if they are still in a staging buffer, prior to being written to the buffer pool extension. The staging buffers described herein allow all the writes to be queued as they wait to be written to the local disk, and if this queue, i.e., a staging buffer(s), becomes too long, new page writes can be evicted immediately. This allows for maximum throughput from the storage device, and when even at maximum throughput, the flushing buffer pool operations such as checkpoint and eviction are not penalized. Also, as noted above, the specific utilization of staging buffers described herein imposes a much less restrictive update latch on the pages going to disk, and does not require an exclusive latch. This staging buffer implementation is also configured to fall back to skipping writes if the overall writing pipeline becomes too busy. That is, a compute node is enabled to write to a resilient cache without paying a high performance cost. In some cases, this allows compute nodes to avoid writes for any page to disk as storage nodes already do so. Additionally, interfaces with the buffer pool extension storage/memory are presented like regular read and write file operations which work on best effort basis—that is, the staging buffers and corresponding metadata table updates are handled within the writing pipeline in such a way that only performance improvements are visible outside the pipeline. It should also be noted that a write to the buffer pool extension may queue an operation that might fail silently later, and therefore, associated read operations might also fail if the target page is not there, which will be interpreted as a cache miss, and the page can be retried from the backend storage, e.g., page servers.

Accordingly, the embodiments herein provide for solutions to issues with data write throughput from buffer pools, restrictive latching, and data operations on in-flight/in-process writes through a unique staging buffer and tracking of metadata for in-flight/in-process writes. These and other embodiments will be described in further detail below in this Section, in association with the Figures, and in Sections/Subsections that follow.

Systems, devices, and apparatuses herein may be configured in various ways for local page writes via pre-staging buffers for resilient buffer pool extensions, such as distributed DB systems, data warehouses that maintain large databases, and/or the like. For instance, FIG. 1 will now be described. FIG. 1 shows a block diagram of a system 100 that is configured for local page writes via pre-staging buffers for resilient buffer pool extensions, according to example embodiments.

As shown in FIG. 1, system 100 includes a user device 102 and a data system 104. In embodiments, user device 102 and data system 104 communicate with each other over a network 112. It should be noted that in various embodiments different numbers of user devices and/or data system, and/or subcomponents thereof, are present. Additionally, according to embodiments, any combination of the systems and/or components illustrated in FIG. 1 are present in system 100.

Network 112 comprises different numbers and/or types of communication links that connect devices, platforms, and hosts/servers such as, but not limited to, the Internet, wired or wireless networks and portions thereof, point-to-point connections, local area networks, enterprise networks, cloud networks, and/or the like, in embodiments.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for interacting with a database, data warehouse, and/or database server, such as providing queries against tables/data sets.

User device 102 also includes additional components (not shown for brevity and illustrative clarity) including, but not limited to, components and subcomponents of other devices and/or systems herein, in embodiments. In some embodiments, user device 102 may comprise a computing device/system hosting a service or application that provides queries against tables/data sets.

Data system 104 may be a database system, including distributed implementations, a data warehouse, and/or the like, and comprises one or more server computers, computing systems, and/or computing devices, which may include one or more distributed or "cloud-based" servers in embodiments. Data system 104 may comprise one or more on-premises servers in addition to, or in lieu of, cloud-based servers, in different implementations contemplated herein. Various systems/devices herein, such as data system 104, are configured to provide services utilized by user device 102, such as business services and/or applications involving data warehousing, database hosting, and/or like. For instance, data system 104 includes one or more compute pool(s) 108 that may each include, without limitation, a control node, a DQP, one or more compute nodes, and/or the like, as described herein. Data system 104 also includes a transaction manager node 110 associated with compute pool(s) 108, as well as additional components configured to perform functions for local page writes via pre-staging buffers for resilient buffer pool extensions, as described in further detail herein, and one or more data files 106 ("data files 106" hereinafter) which may be data sets, as noted above.

Data files 106 include databases and/or the like that comprise tables of data, in embodiments, which may be very large data files/sets such as for "Big Data" analytics and/or data warehousing. It is contemplated herein that one or more of data files 106 are to the order of petabytes, or more, in embodiments. Data files 106 may include any type of data, including relational data, organized as tables having columns for the data.

As noted above, compute pool(s) 108 may include a control node that comprises one or more server computers, server systems, and/or computing devices, such as an on-premises server(s) in addition to, or in lieu of, cloud-based servers. A control node may include an instance of a database server application and is configured to act as the query endpoint for incoming queries, to produce a distributed plan for an incoming query in conjunction with a DQP. In embodiments, a compute node and a DQP may be logically and/or physically separate, or combined in whole/part. The distributed query plan divides work for query processing among compute nodes of compute pool(s) 108. That is, according to embodiments, a control node and a DQP are configured to receive and transform an incoming query into a set of queries that are run against distributions of a data file/data set, e.g., in parallel, via the compute nodes.

Compute nodes may each comprise one or more server computers, server systems, and/or computing devices, such as an on-premises server(s) in addition to, or in lieu of, cloud-based servers. Compute nodes may also each include an instance of a database server application, and are configured to read and/or process data from one or more distributions of large tables in performance of query execution tasks as distributed by the control node/DQP. Compute nodes may also each include a cache to locally store rows or pages of a table for faster access thereto as needed for operations of transactions thereon. In embodiments herein, compute nodes are configured to perform functions and/or operations for local page writes via pre-staging buffers for resilient buffer pool extensions as described.

Transaction manager node 110 may be configured to drive versioning and semantics for query transactions in distributed systems. For example, transaction manager node 110 is configured to version, or uniquely identify, incoming queries that alter or modify data (i.e., queries that are not read-only) and data that is altered/modified by such queries. Transaction manager node 110 is also configured to supervise and maintain active, commit, and abort information for such queries.

As noted above, data system 104 may include one or more distributed or "cloud-based" servers, in embodiments. That is, data system 104 may be a network, or "cloud," implementation for applications and/or services associated with hosting databases and/or data warehousing in a network architecture/cloud platform. A cloud platform includes a networked set of computing resources, including servers, routers, etc., that are configurable, shareable, provide data security, and are accessible over a network such as the Internet, according to embodiments. Cloud applications/services for hosting databases and/or data warehousing are configured to run on these computing resources, often atop an operating system (OS)/operating systems that run on the resources, for entities that access the applications/services, locally and/or over the network. A cloud platform is configured to support multi-tenancy as noted above, where cloud platform-based software services multiple tenants, with each tenant including one or more users who share common access to certain software services and applications of the cloud platform, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

While a database system or data warehouse (e.g., data system 104) is shown in system 100 for non-limiting purposes of description and illustration, in various embodiments, alternate implementations for database hosting and/or the like are also contemplated herein.

Figure 2:
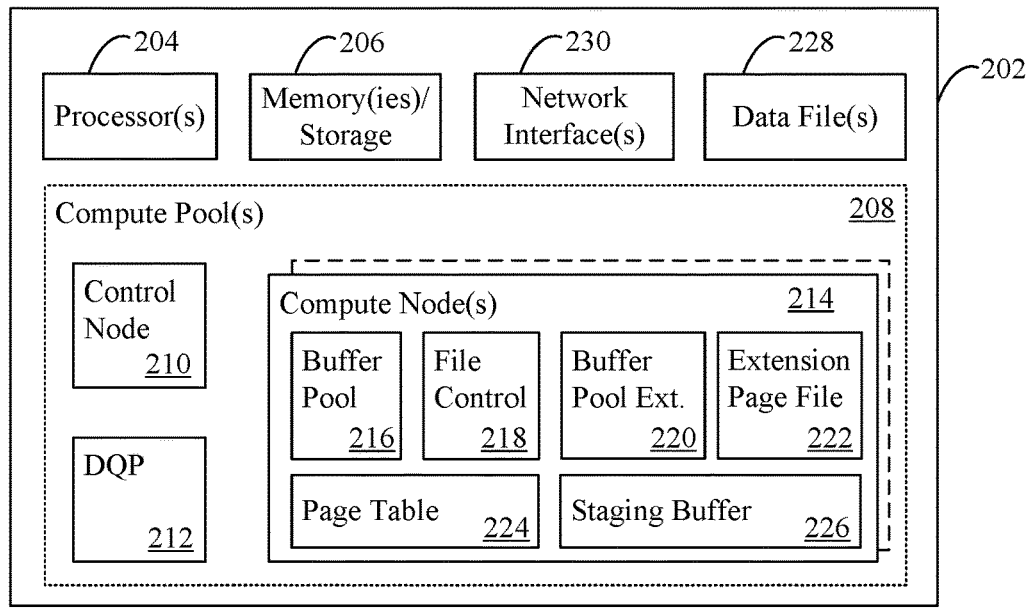
FIG. 2 shows a block diagram of a computing system for local page writes via pre-staging buffers for resilient buffer pool extensions, according to an example embodiment.

Referring now to FIG. 2, a block diagram of a system 200 is shown for local page writes via pre-staging buffers for resilient buffer pool extensions, according to an example embodiment. System 200 as exemplarily illustrated and described is configured to be an embodiment of data system 104 of system 100 in FIG. 1. That is, system 200 is illustrated as being configured to perform operations of a database system, a data warehouse, etc., based at least on the techniques described herein. System 200 is described as follows.

System 200 includes a computing system 202 which is any type of server or computing system, as mentioned elsewhere herein, or as otherwise known, including without limitation cloud-based systems, on-premises servers, distributed network architectures, a data warehouse or portions thereof, and/or the like. As shown in FIG. 2, computing system 202 includes one or more processors ("processor") 204, one or more of a memory and/or other physical storage device ("memory") 206, as well as one or more network interfaces ("network interface") 230. Computing system 202 also includes a compute pool(s) 208 (which may be any number of compute pools, and which may be comprised of one or more servers, virtual data warehouse instances of a data warehouse system, and/or the like, in embodiments). It should be noted that while not shown for brevity and illustrative clarity, system 200 may also include a transaction manager or a transaction manager node, a garbage collector, a lock manager service, as well as other components generally utilized for database and data warehouse implementations, as would be understood by persons of skill in the relevant art(s) having the benefit of this disclosure. Also illustrated for system 200 is one or more data file(s) 228 (also "data files 228" hereinafter), which may be an embodiment of data files 106 of FIG. 1 and may include one or more user tables, data sets, data files, etc., of user data against which transactions of queries are performed.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., a cache(s), temporary database memory, etc., for versioning and/or query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of compute pool(s) 208, including one or more of the components thereof as described herein, which may be implemented as computer program instructions, or alternative as hardware, as described herein, and stored in memory 206.

Memory 206 includes volatile storage portions such as a random access memory (RAM) and/or persistent storage portions such as disks/hard drives, non-volatile RAM, caches, and/or the like, to store or be configured to store computer program instructions/code for local page writes via pre-staging buffers for resilient buffer pool extensions as described herein, as well as to store other information and data described in this disclosure including, without limitation, data sets, tables of information associated with queries, indexes, lists or tables of data version information, different types of metadata (including but not limited to global metadata, page tables, etc.), timestamps, and/or the like, in different embodiments. For instance, computing system 202 also includes a page table 224 and data files 224 which may be stored in memory 206, e.g., as on-disk storage, in caches of systems and/or components described herein, and/or the like. In embodiments, such data, types of metadata, and/or information may be stored in a storage external to computing system 202, and may be available for sharing/use by computing system 202 and/or other systems (e.g., multiple pools of compute/processing nodes, external systems, as described herein, etc.) via a network or storage interface. Memory 206 may comprise internal and/or external portions in embodiments.

Network interface 230 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100 in FIG. 1, including systems that store data sets, user devices, compute nodes, and/or the like, over a network such as network 112.

System 200 also includes additional components (not shown for brevity and illustrative clarity) including, but not limited to, components and subcomponents of other devices and/or systems herein, an operating system(s), and/or those described below with respect to FIG. 9, according to embodiments.

Compute pool(s) 208 may be an embodiment of compute pool(s) 108 in FIG. 1, as described above. In the illustrated embodiment, compute pool(s) 208 includes a control node 210, a distributed query processor (DQP) 212, and one or more compute node(s) 214, although embodiments contemplate different numbers of one or more of these components in various implementations. Likewise, one or more of compute pool(s) 208 may be present computing system 202.

Control node 210 may comprise any database server application, in addition to processors and memory, described above, and operate as a front end, or a query endpoint, in embodiments, that receives queries from user devices, services, applications, and/or the like. Control node 210 may include a data definition language (DDL) engine and a query optimizer, in embodiments. A DDL engine is configured to execute statements to create, modify, and delete tables, indexes, and relationships in a data set/data file, e.g., based at least on an incoming query. In embodiments, a DDL engine is configured to execute statements to create, modify, and/or delete rows in tables, tables themselves, lists, arrays, and/or other data structures that are generated in performance of the query transactions. A query optimizer is configured to generate query plans for execution of incoming queries against tables, data sets, etc. based at least on the incoming queries and other information, e.g., cardinality estimates, etc. To begin query execution, control node 210 may communicate with a transaction manager node (not shown) and provide information associated with a query (e.g., an application programming interface (API) call responsive to receiving the query) such that the transaction manager node is enabled to assign a transaction start identifier (i.e., a begin sequence number) for the query.

DQP 212 may include subcomponents such as a deserializer, a Directed Acyclic Graph (DAG) generator, a workload manager, and/or the like in embodiments, and may be configured to orchestrate a query task DAG across large numbers, e.g., thousands, of compute nodes at petabyte-scale reliably. A deserializer is configured to deserialize requests for distributed query processing on data set distributions, received from control node 210, and to provide its output to the DAG generator which in turn is configured to generate a DAG, such as a static DAG that outlines process dependencies and operations for performing distributed execution of query tasks/transactions at ones of compute node(s) 214. DAGs are provided from the DAG generator to the workload manager which is configured to assign ones of compute node(s) 214 to perform the tasks/transactions in accordance with the embodiments herein for local page writes via pre-staging buffers for resilient buffer pool extensions.

Control node 210 may be a logically or physically separate entity from other components of computing system 202, and DQP 212 may be a logically or physically separate entity from other components of computing system 202. For example, in some embodiments, control node 210 and DQP 212 may be implemented in different physical or logical server hosts that are communicably linked. In such embodiments, DQP 212 may comprise a separate server node while control node 210 comprises its own server.

Compute node(s) 214 may comprise any database server application, in addition to processors and memory described above, and operate as a back end, in embodiments, that receives portions of distributed query tasks/transactions from control node 210 and/or DQP 212. One or more compute node(s) 214 may be present in given embodiments, and each of compute node(s) 214 may include a data definition language (DDL) engine and a query optimizer, in embodiments, as described above. Compute node(s) 214 is configured to operate in accordance with embodiments for local page writes via pre-staging buffers for resilient buffer pool extensions, as described herein. As shown, compute node(s) 214 includes a plurality of hardware and/or software components: a buffer pool 216, a file control block 218, a buffer pool extension 220 ("buffer extension 220"), an extension page file 222, a page table 224, and a staging buffer 226. In embodiments, one or more of compute node(s) 214 may respectively include one or more of these components.

Staging buffer 226 may comprise an in-memory storage, such as a cache or other temporary storage, and is configured to receive write transaction data/data pages from buffer pool 216 that are destined for buffer pool extension 220. As noted herein, staging buffers such as staging buffer 226 may operate as or embody segments that represent contiguous areas in the local file in the local memory where the data pages are persistently stored. Staging buffer 226 is configured to enables writes thereto that are not in-place such that any new writes, inserts, updates, etc., are written to a new location of staging buffer 226. Embodiments further provide for multiple instances of staging buffer 226 and/or segments thereof, as described herein. Staging buffer 226 may be logically divided into segments, in embodiments, which may contain multiple data pages, and the number of data pages per segment may be any factor of 2 and may correspond to the configuration of extension page file 222 described below.

Buffer pool 216 may comprise a memory component, e.g., an in-memory component such as a cache or the like, and may comprise a portion of memory 206. Buffer pool 216 may be configured to temporarily store or cache write transactions for data of data file(s) 228 performed by compute node(s) 214, and may provide written data associated therewith to an on-disk, persistent storage that maintains a database, such as a page server or the like storing data file(s) 228. In embodiments, as noted above, a compute node of compute node(s) 214 may locally store/cache modified/written data locally for faster access thereto. In such cases, the modified/written data is stored in extension page file 222 via buffer pool extension 220.

File control block 218 is configured to provide read and write input/output
(I/O) traffic from buffer pool 216 directed to buffer pool extension 220 and/or data file(s) 228.

Buffer pool extension 220 may be logically attached to file control block 218 to monitor the I/O traffic in a compute node, and is configured to perform as a write-through cache for the data pages. Extension page file 222 is logically divided into segments, in embodiments, which may contain multiple data pages. The number of data pages per segment may be any factor of 2, in embodiments, and the size of the segments may be configured and/or changed for, or in, different implementations. Accordingly, given an offset in extension page file 222, the segment to which it belongs can be directly calculated.

Page table 224 may cache or otherwise store metadata, which describes the data pages cached in buffer pool extension 220 and staging buffer 226, in a memory-optimized table for a master database. Page table 224 may be a fully-fledged table in which the transactions done to it are atomic and durable, in embodiments, this allows for page lookups in in buffer pool extension 220 and staging buffer 226, which is equivalent to an in-memory index lookup in page table 224. Page table 224 may also be durable, and as a result, the metadata of the cached data pages is not lost on server restarts. By using a memory-optimized table for storing the metadata of cached data pages for the embodiments herein, the cost of accessing and updating the metadata may be as minimal as possible, while also providing metadata durability at the same time.

It is also contemplated herein that one or more of control node 210, DQP 212, and/or compute node(s) 214 may include an application programming interface(s) (API(s)) in order to access/receive information therein, therebetween, and/or of a transaction manager node, as well as to perform operations such as commits, aborts, and/or the like.

Further details regarding the operations and configurations of compute node(s) 214 are provided in the embodiments herein, including those shown in the instant Figures and discussed in their associated descriptions.

Figure 3:
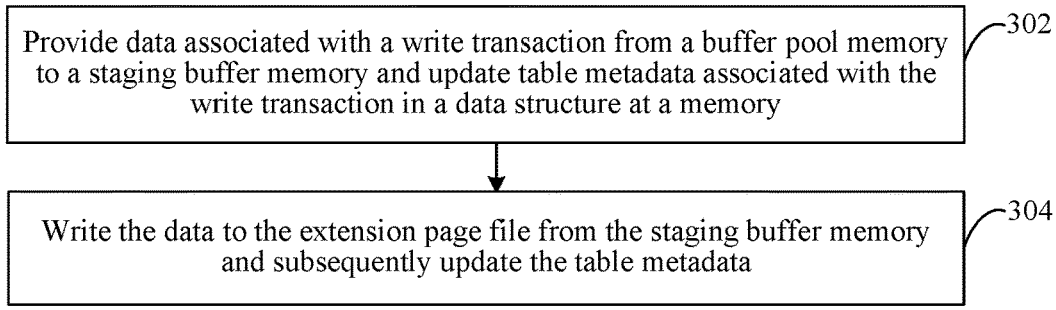
FIG. 3 shows a flowchart for local page writes via pre-staging buffers for resilient buffer pool extensions, in accordance with an example embodiment.

FIG. 3 shows a flowchart 300 for local page writes via pre-staging buffers for resilient buffer pool extensions, in accordance with an example embodiment. Further structural and operational examples will be apparent to persons skilled in the relevant art(s) based at least on the following descriptions. Flowchart 300 is described as follows with respect to system 200 of FIG. 2.

Flowchart 300 begins at step 302. In step 302, data associated with a write transaction is provided from a buffer pool memory to a staging buffer memory and table metadata associated with the write transaction is updated in a data structure at a memory. For instance, as described above, computing system 202 of system 200 in FIG. 2 is configured to perform a copying of write transaction data to staging buffer 226 from buffer pool 216, instead of immediately writing the data to extension page file 222. Additionally, page table 224 is updated for the write transaction to indicate that the data is in-flight or that the write is in-process. Further details regarding such performance are provided herein and in the Figures.

In step 304, the data is written to the extension page file from the staging buffer memory and table metadata is subsequently updated. For example, as described above, in computing system 202 of system 200 in FIG. 2, staging buffer 226 is enabled and configured to provide data stored therein to extension page file 222. Additionally, page table 224 is further updated for the write transaction to indicate that the data is valid and/or available, i.e., that the write transaction to extension page file 222 is complete. Further details regarding such performance are provided herein and in the Figures.

Figure 4:
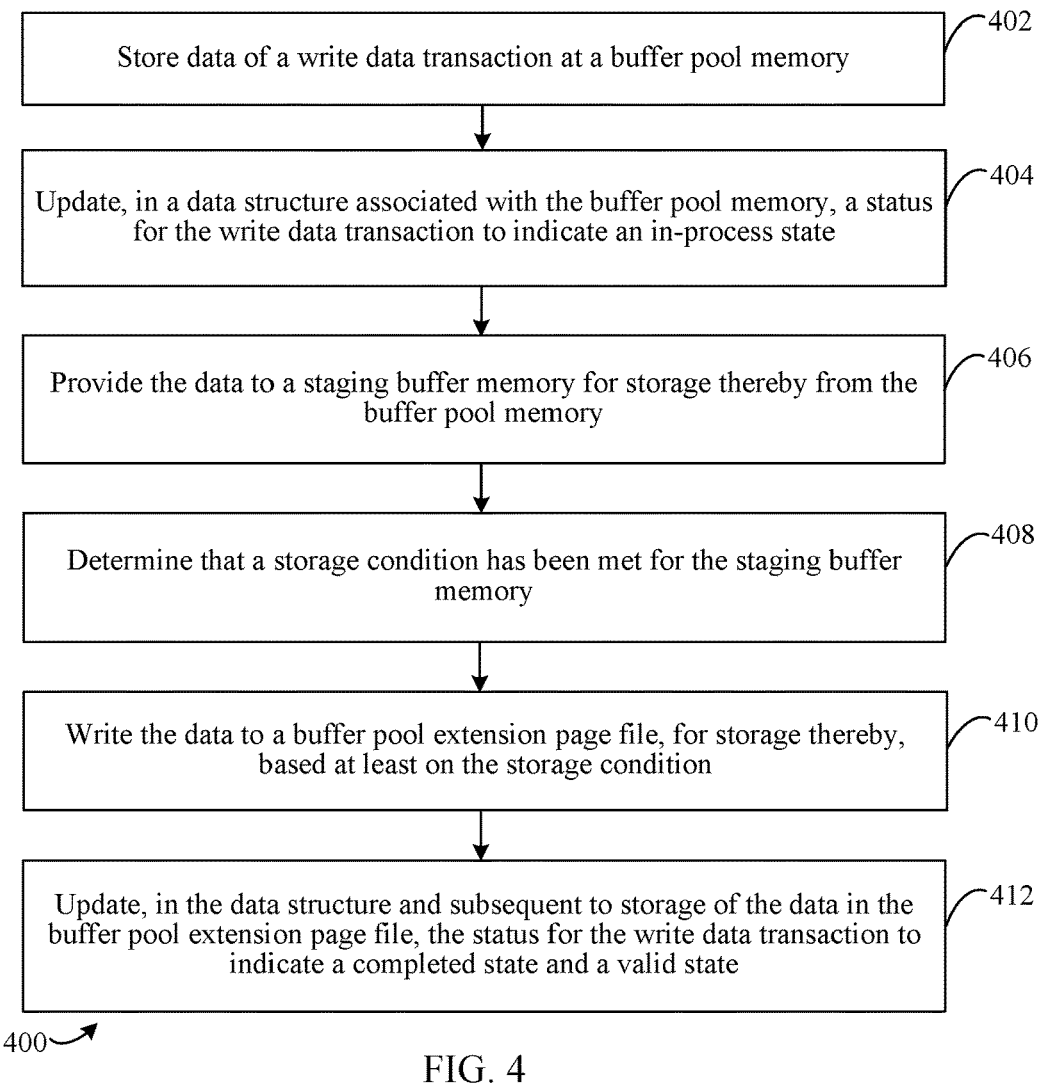
FIG. 4 shows a flowchart for local page writes via pre-staging buffers for resilient buffer pool extensions, in accordance with an example embodiment.
Figure 5:
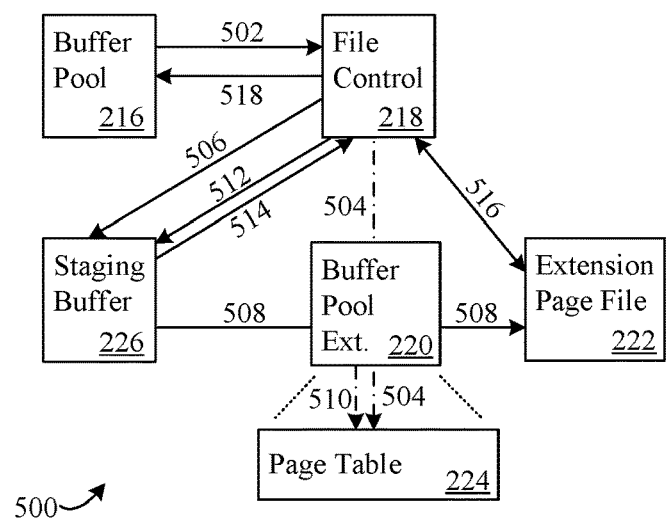
FIG. 5 shows a flow diagram for local page writes via pre-staging buffers for resilient buffer pool extensions, in accordance with an example embodiment.

FIG. 4 and FIG. 5 will now be described. FIG. 4 shows a flowchart 400 for local page writes via pre-staging buffers for resilient buffer pool extensions, in accordance with an example embodiment. Further structural and operational examples will be apparent to persons skilled in the relevant art(s) based at least on the following descriptions. Flowchart 400 may be an embodiment of flowchart 300 of FIG. 3, and is described as below with respect to system 200 of FIG. 2. FIG. 5 shows a flow diagram 500 for local page writes via pre-staging buffers for resilient buffer pool extensions, in accordance with an example embodiment. Flow diagram 500 may be an embodiment of FIG. 2 and/or FIG. 4.

Flowchart 400 begins at step 402. In step 402, data of a write data transaction is stored at a buffer pool memory. For instance, buffer pool 216 of FIG. 2 may have stored therein a write data transaction that is performed on data of a database, e.g., of data file(s) 228, as described herein. The write data transaction may be for a new write, an insert, an update, and/or the like. With reference to flow diagram 500 of FIG. 5, in operation 502, file control block 218 may receive an indication of a write request for the data. Compute node(s) 214 may place a lock on the data page in buffer pool 216 prior to said provide the data to the staging buffer memory.

When a write request is received, a check will be made to determine if the data page is already cached. If it is, the data page must be invalidated first to reflect that a new version of the data page exists. If it does not exist in page table 224, a new entry is created, also with corresponding state column being set to 'invalid'. In both cases, the state column will be set again to 'valid' once the write operation to the local extension page file 222 completes.

In step 404, a status for the write data transaction is updated in a data structure associated with the buffer pool memory to indicate an in-process state. For example, and also with reference to flow diagram 500 of FIG. 5, file control block 218 and/or buffer pool extension 220 of FIG. 2 may determine that the data for the request in operation 502 is to be stored locally by compute node(s) 214. Accordingly, to accompany the local storage of the data, page table 224 should be written to and/or updated to reflect the status of the data and the data write transaction, in operation 504 as staging buffer 226 will first receive, and pre-stage, the data prior to it being provided to extension page file 222.

In step 406, the data is provided to a staging buffer memory, for storage thereby, from the buffer pool memory. For instance, and with reference to flow diagram 500 of FIG. 5, via file control block 218 of FIG. 2 the data is provided to staging buffer 226 in operation 506, and staging buffer 226 stages the data prior to it being written to extension page file 222. Compute node(s) 214 may determine that the providing of the data to staging buffer 226 has reached completion, and then release the lock based on the completion, and prior to determining that a storage condition has been met, as described below.

In step 408, it is determined that a storage condition has been met for the staging buffer memory. For example, compute node(s) 214 may determine via buffer pool extension 220 that one or more storage conditions for staging buffer 226 have been met. In embodiments, the storage condition may be one or more of: a determination that staging buffer 226 is full, which may also include or provoke a determination of another instance of staging buffer 226 to receive other data of a subsequent write data transaction and/or a determination that the data page has been stored in staging buffer 226 for a predetermined period of time.

In step 410, the data is written to a buffer pool extension page file, for storage thereby, based at least on the storage condition. For instance, referring also to flow diagram 500 of FIG. 5, the storage condition determination in step 408 of flowchart 400 may provoke, e.g., via buffer pool extension 220, the writing of the data in staging buffer 226 to extension page file 222 as shown in operation 508. In embodiments, writing the data to extension page file 222 in operation 508 may include encrypting the data at staging buffer 226 subsequent to providing the data thereto as described above. Decrypting the data may subsequently take place on the READ path when the data is read.

In step 412, the status for the write data transaction is updated in the data structure, subsequent to storage of the data in the buffer pool extension page file, to indicate a completed state and a valid state. For example, referring also to flow diagram 500 of FIG. 5, when extension page file 222 receives the data and the writing of the data thereto is completed, as in operation 508, page table 224 is updated to reflect the status of the write transaction as "available" and/or "valid" in an operation 510. In embodiments, data written to extension page file 222 is persisted thereby, as described herein, and operation 508 may be an I/O operation.

In some embodiments, and subsequent to the data being provided to staging buffer 226 and/or to extension page file 222, file control block 218 may receive a request via buffer pool 216 for a read of the data. With reference still to FIG. 5 and flow diagram 500, in an operation 512, it may be determined if staging buffer 226 still stores the data. If so, the data may be returned to file control block 218 in an operation 514 and subsequently provided to buffer pool 216 in an operation 518 to complete the transaction. If it is determined that staging buffer 226 does not store the data, it is determined if the data is present in extension page file 222, where it may be returned, if present and valid, via an operation 516 and then via operation 518 to complete the read transaction. In other words, compute node(s) 214 are configured to receive a read data transaction directed to the data, determine a location of the data, and read the data from either the staging buffer memory based at least on the data being located in the staging buffer memory and having the status that indicates the in-process state, or from the extension page file based at least on the data being located in the extension page file and having the status that indicates the completed state and the valid state.

It should also be noted that operation 506 may be subsequently performed for updates to the data in staging buffer 226 prior to operation 508 being performed, where the updated data is provided to staging buffer 226 for storage/caching "in-place." In embodiments, a new location may be required, at the same or another instance of staging buffer 226 that does not store the prior version of the data, if an update is made subsequent to the data being provided to extension page file 222.

Embodiments herein also provide for the transfer of frequently-used data pages between instances of extension page file 222. In one example, it may be determined that extension page file 222 has a number of data pages stored therein that does not meet or exceed an occupancy threshold but that the data page is accessed or updated a number of times that meets or exceeds an access threshold (i.e., the data page is "hot" or frequently-used). In such scenarios, embodiments allow for providing the data page to another instance of extension page file 222in a lock-free operation based at least on the storage condition prior to providing the data by buffer pool extension 220.

Embodiments herein also provide for different eviction mechanisms for data pages. In one example, the data page may be evicted from buffer pool 216 responsive to or subsequent to providing the data page to staging buffer 226. Thus, buffer pool 216 is alleviated of maintaining the data page even before the data page is provided to buffer pool extension 220.

Further, regarding eviction, valid pages found in page table 224 may be assigned a volatile structure in memory, e.g., a 'PageVolatile' designator. This structure includes, without limitation, a timestamp that is updated every time the page is touched, e.g., in buffer pool 220. Segment objects also have a timestamp object that is updated via an interlocked 'max' operation every time the pages associated with the segment have their respective timestamps updated. Therefore, the segment itself has the highest timestamp of the group of pages. This is used by eviction logic which finds the segments with the lowest timestamp and deletes the pages of that segment, in embodiments. As pages are associated with a segment, its segment reference counter is incremented. Similarly, when pages are removed from segments, that counter gets decremented. This process eventually makes the segment reference counter reach zero, and when the counter reaches zero, the segment may be moved to the list of free segments.

The eviction logic also determines segment with low occupancy and may delete the pages in these segments to completely free the segment. Because some of those pages might be considered "hot," these pages may be written back in the current write or staging buffer of the buffer pool. This may be performed in embodiments by queueing a work operation associated with the page key, and when the work operation is processed, the page is searched for in the buffer pool. If found, the page will be inserted in the current write or staging buffer of the buffer pool. If a page that needs to be relocated from a low occupancy segment is not in the buffer pool, then a lazy read page logic (e.g., a background thread that may limit the number of outstanding reads) will attempt to read the page into a temporary buffer and submit it to be written in the current write/staging buffer object.

Figures 6, 7:
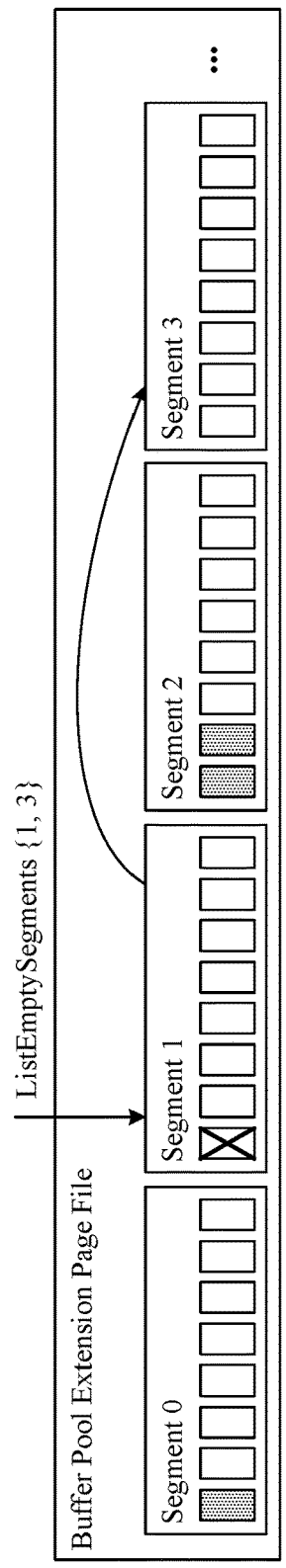
FIG. 6 shows a diagram of data structures for local page writes via pre-staging buffers for resilient buffer pool extensions, in accordance with an example embodiment.
FIG. 7 shows a block diagram of an extension page file for local page writes via pre-staging buffers for resilient buffer pool extensions, in accordance with an example embodiment.

FIG. 6 and FIG. 7, each of which are for local page writes via pre-staging buffers for resilient buffer pool extensions, will now be described with reference to each other in the context of the description above. FIG. 6 shows a data structure 600 of a page table 602A/602B and a segment object 604, in accordance with an example embodiment, and FIG. 7 shows a block diagram of an extension page file 700, of a buffer pool, that corresponds to data structures 600, in accordance with an example embodiment. Further structural and operational examples will be apparent to persons skilled in the relevant art(s) based at least on the following descriptions.

In FIG. 6 and data structures 600, page table 602A associates a database page key, which may comprise a database identifier (ID), a file ID, and page ID, to a byte offset in in extension page file 700 of FIG. 7. At bootstrap, an array of segment objects is created and initialized, and page table 602A is scanned fully. For every page found in page table 602A with 'Valid' state, the corresponding segment is picked from its global array and the page gets associated with its segment. If a page is not in the 'Valid' state, then it is deleted from page table 602A as is reflected in page table 602B.

At the end of this process, there is a group of segments that are in use, and another group that is "free" or "empty." The segments that were not used are added to a list, e.g., as a linked list, of empty/free segments.

In the example shown for FIG. 6 and FIG. 7, there are four data pages in page table 602A for a database with a DB ID of '5' and a File ID of '1'. The data page with Page Key {5, 1, 0×2} is 'Invalid,' and thus will be deleted during the bootstrap process. The other three data pages with DB ID '5' and File ID Fare associated with two different segments: segment 0 and segment 2. In embodiments, each segment object has an array of page keys and a reference count which will get updated as is shown for segment object 604. That is, Segment ID '0' has its single data page identified and a corresponding Reference Count of '1'; Segment ID '1' has no data pages (its only data page was 'Invalid' and thus deleted) and a corresponding Reference Count of '0'; Segment ID '2' has two data pages identified and a corresponding Reference Count of '2'; and Segment ID '3' has no data pages identified and a corresponding Reference Count of '0'.

This is further reflected in FIG. 7 and extension page file 700 which shows

Segment ID '0' with a single data page present, Segment ID '1' with a now deleted data page (shown with an 'X') and being free or empty, Segment ID '2' with two data pages present, and Segment ID '3' with no data pages and being free or empty.

Figure 8:
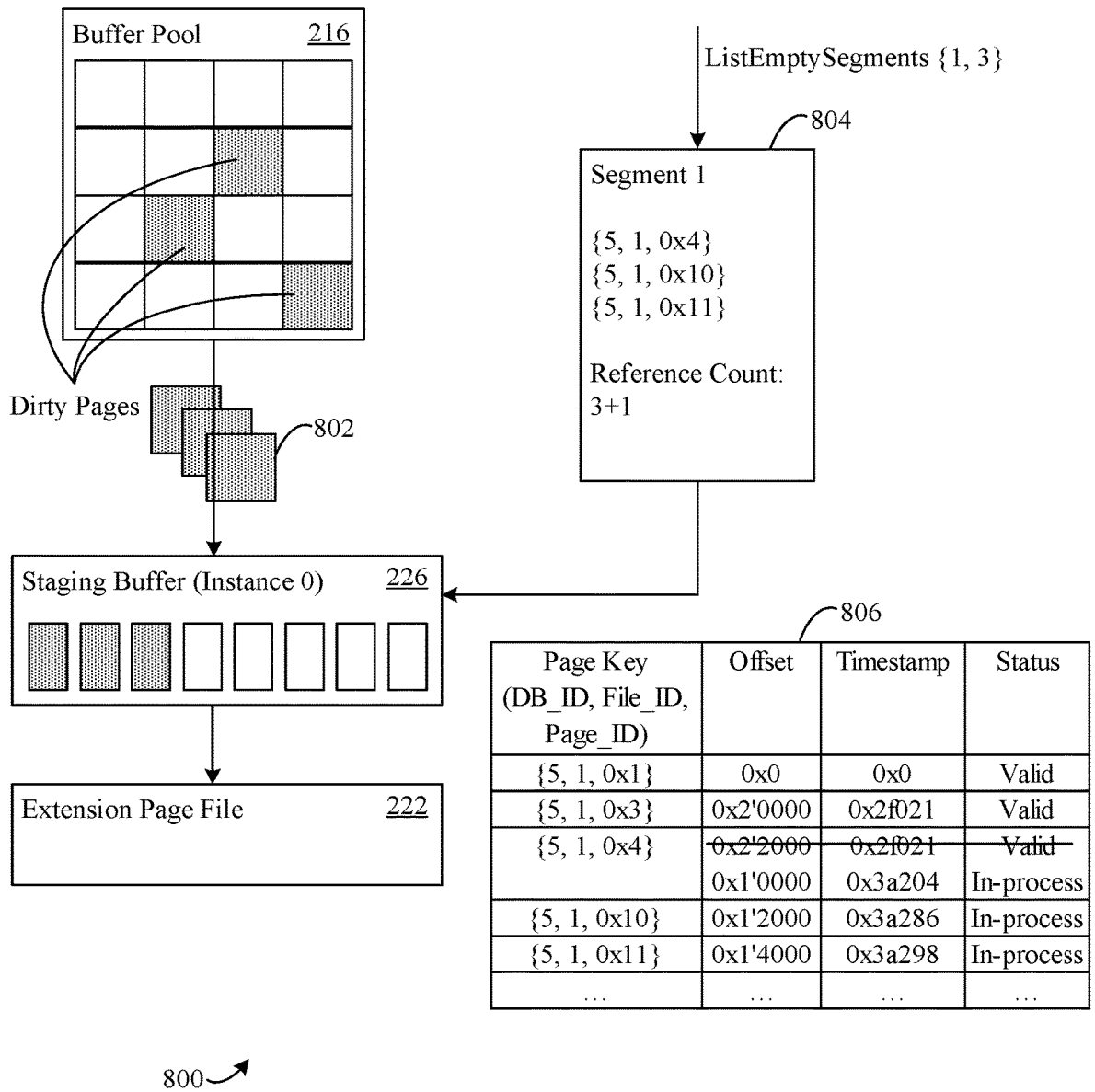
FIG. 8 shows a block diagram of a system for local page writes via pre-staging buffers for resilient buffer pool extensions, according to an example embodiment.

Turning now to FIG. 8, a block diagram of a system 800 for local page writes via pre-staging buffers for resilient buffer pool extensions is shown, according to an example embodiment. System 800 as exemplarily illustrated and described is configured to be an embodiment of system 200 in FIG. 2. That is, system 800 is illustrated as being configured to perform operations of a database system, a data warehouse, etc., based at least on the techniques described herein. System 800 also continues the examples set forth in FIGS. 6 and 7 (with a page table 806 being an embodiment of page table 602B of FIG. 6), and is described as follows.

System 800 is illustrated as including buffer pool 216 and staging buffer 226, described above with respect to FIG. 2. In the context of system 800, when buffer pool 216 needs to flush dirty pages 802 maintained therein, buffer pool 216 may invoke a write function for buffer pool extension 220 under an object of file control block 218 (not shown) that is associated with the corresponding database and data file. Buffer pool extension 220 will find a free offset in the current free segment object that was previously obtained from the list of empty segments and determine if the page exists in the page table. If it does, the page is marked as 'in-flight' or 'in-process', but if not, then the page will be inserted with the 'in-flight' or 'in-process' state. In both cases, the page is assigned to the new offset and is copied in staging buffer 226 in the corresponding position of its new offset. A new offset may be calculated based on the segment object associated with staging buffer 226. Extension page file 222 may be divided in equal parts, e.g., each part mapping to one segment, and therefore each segment, in use or free, has a known offset in extension page file 222. Within that segment, the page offset may be determined by the offset of the segment plus the position of the page within staging buffer 226.

System 800 illustrates three dirty pages 802 in buffer pool 216 being written to buffer pool extension 220. Dirty pages 802 are copied into a temporary/write buffer, e.g., staging buffer 226, maintained by an instance of a staging buffer object of buffer pool 216. Staging buffer 226 is associated with a segment object 804 obtained from the list of empty/free segment (here Segment 1 is at the head of the list of empty segments). As dirty pages 802 are copied to staging buffer 226, they are also associated with segment object 804. A reference counter is incremented for each page and one extra temporary reference belongs to the object of staging buffer 226.

In system 800, one of dirty pages 802 already existed in page table 806: Page

Key {5, 1, 0x4}. The page previously had an offset at position 0x2'2000 in the page file, which corresponds to Segment 2 in FIG. 7. Segment 2 in FIG. 7 had two pages associated therewith, however, because of the update, Segment 2 in FIG. 7 will lose one page and one reference count. Once the reference count reaches zero for Segment 2, its object will be pushed to the list of empty segments.

If staging buffer 226 becomes full, a new one instance may be allocated as the current write/staging buffer, and the complete/full buffer may be written to buffer pool extension 220 as described herein, e.g., via staging buffer 226. Upon the completion of the write operation to extension page file 222 via staging buffer 226, a new transaction will change the state of the corresponding dirty pages 802 in the buffer from 'in-flight' or 'in-process' to 'Valid' in page table 806.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1, system 200 in FIG. 2, and system 800 in FIG. 8, along with any components and/or subcomponents thereof, as well any data structures, and operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 9:
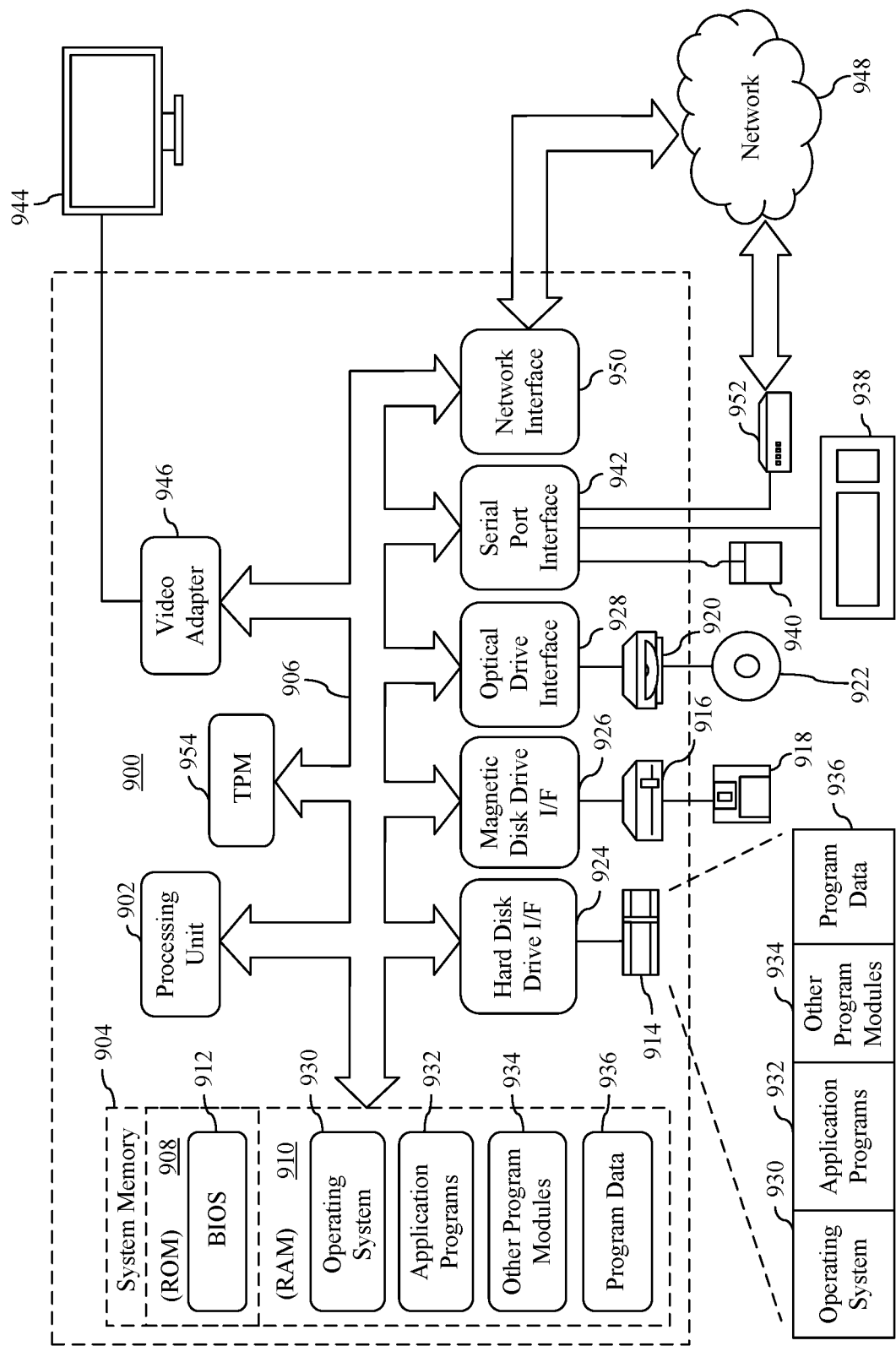
FIG. 9 shows a block diagram of an example computing device that may be used to implement embodiments.

FIG. 9 depicts an exemplary implementation of a computing device 900 in which embodiments may be implemented. For example, embodiments described herein may be implemented in one or more computing devices or systems similar to computing device 900, or multiple instances of computing device 900, in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, servers, and/or clusters, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as but not limited to, system 100 in FIG. 1, system 200 in FIG. 2, and system 800 in FIG. 8, along with any components and/or subcomponents thereof, as well any data structures, and operations of the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

TPM 954 may be connected to bus 906, and may be an embodiment of any

TPM, as would be understood by one of skill in the relevant art(s) having the benefit of this disclosure. For example, TPM 954 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for local page writes via pre-staging buffers for resilient buffer pool extensions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The embodiments herein enable compute nodes database systems, data warehouses, etc., to avoid flushing data pages from buffer pools to permanent storage by using staging buffers. Writes to permanent storage are performed by storage nodes of the systems as they consume transaction logs generated by a primary compute node. The unique embodiments described herein allow for the writing of data pages locally in a compute node without creating a burden for workloads, which provides a significant performance advantage for the systems. Compute nodes may thus maintain and utilize a resilient cache without paying for its use in terms of system resources, performance, and efficiency.

Staging buffers in the embodiments herein represent outstanding buffers of multiple pages, tracking the pages from the point they are accumulated in a staging buffer, and then writing the gathered pages as one write operation to the buffer pool extension and extension page file. Additionally, embodiments provide for setting the correct metadata for these pages in page tables upon their completion, and when the staging buffers empty, their objects are returned to list of empty segments to be reused for subsequent write transactions. During the lifetime of the staging buffer objects, requests to read and write pages into the staging buffers can be fulfilled. For instance, after a buffer pool flushes a page into the current staging buffer instance, the buffer pool may evict the page. Later, the page might be needed again, and if the page is not yet written to disk, it is still maintained in the staging buffer waiting to be written or to have its completion processed and may thus be updated or read from there. Such reads may be enabled via obtaining an extra reference count for a page in a staging buffer to prevent the page from being released and read the page out. This mechanism essentially operates a read-file operation and may call the completion callback function of a read-file operation as implemented by the layer above. Staging buffers also track all work items objects used to fill pages therein. On successful completion of transactions, tracked work items are released which triggers the respective completion callback functions.

The following description provides exemplary SQL Server® algorithms that can be used for writing and reading pages according to embodiments where a buffer pool extension is enabled. Also described are example algorithms for caching clean pages in a buffer pool extension and an example strategy for eviction of cold pages. The following description is provided as exemplary and illustrative in nature by way of example, and is not to be considered limiting.

Embodiments can utilize two basic APIs for writing to a file managed by a file control block (e.g., an FCB object), "FCB::AsyncWrite" and "FCB: :GatherWrite". All other APIs (e.g., FCB::SyncWrite, FCB::WriteMisaligned, etc.) are built on top of these two APIs. AsyncWrite is used for writing a single in-memory buffer to the file at an offset specified by the caller, while GatherWrite is used to write multiple in-memory buffers to a contiguous portion of the file at a specified offset. These APIs internally use an FCBIoRequest object to issue the request, for performing the asynchronous write over the data file, to the SQL OS. The callers of these APIs ensure that the buffers of the pages being written are properly latched before calling them. The latches are released only on I/O completion.

The workflow below describes the 'WriteFile' to RBPEX code path when the staging buffer is utilized, e.g., in a non-covering segment mode:

1. 'RBPEXImpl::AsyncWrite' or 'RBPEXImpl::GatherWrite' is called, usually from a buffer pool flushing dirty page mechanism like checkpoint or lazy writer.

2. In non-covering segment mode, 'RBPEXImpl::QueueSegmentModeWorkItems' function will be called from RBPEX 'AsyncWrite' or 'GatherWrite' functions. It creates a 'RbpexWorkItem' object of type 'rbpeWriteFile' for every page being written and enqueue them into a dedicated completion port handle (see 'm_completionPort' member variable of 'm_segmentModeHost') using 'RBPEXImpl:: PushWorkItemInSegmentMode' function.

3. Worker threads process the 'RbpexWorkItem' objects queued via 'PushWorkItemInSegmentMode' function. The number of threads is configurable, and it should be at least 2. 'WorkerThread' function will dequeue 'RbpexWorkItem' objects from 'm completionPort' via 'CollectWorkItemFromCompletionPort' function. That will pick up items of types 'rbpeOnLruRefresh' and 'rbpeWriteFile' and process them in the function 'WorkItemToProcess::ProcessWorkItem'.

4. 'NonCoveredRbpexSegmentModeHost::WorkerThread' processes several 'RbpexWorkItem' in one transaction. But first, it needs to have a current 'RbpexWriteBuffer' instance in the 'm currentWriteBuffer' pointer. This is set up by the function 'StartNewWriteBufferOrResumePendingOne'. This function also starts a transaction (see 'RbpexWriteBuffer::StartTransaction') and associates the write buffer with a free segment locator by obtaining an available 'SegmentLocator' object via 'GetFreeSegmentLocator' function.

5. The segment locator is what points to the physical offset in the RBPEX page file. It holds a certain amount of pages and the 'SegmentLocator' object tracks how many rows in the 'PageTableRow' table are referencing each segment locator.

6. An item of type 'rbpeOnLruRefresh' contains the page key (e.g.: database ID, file ID, and page ID), therefore the page needs to be searched into the buffer pool and then latched. If the page already exists in the 'PageTableRow' RBPEX table, then its timestamp in the volatile information structure is updated. If it does not exist, then one entry is created and the page 8k buffer is copied into the next available slot of the 'm_currentWriteBuffer' pointer. The page must be clean (not dirty). Dirty pages will make their way to RBPEX when the buffer pool flushes out those pages.

7. An item of type 'rbpeWriteFile' already points to the page data. The caller is the one holding the latch. If the page does not exist in the 'PageTableRow' RBPEX table then one entry is created which will be pointing to a new volatile information structure that points to the current segment locator of the current 'm currentWriteBuffer' pointer.

8. If the page already exists, then it points to a volatile information structure which points to a segment locator, probably different than the one used by the current write buffer object. In that case, another volatile information structure is allocated for a new version of the 'PageTableRow' entry which will point to the current segment locator of the current 'm currentWriteBuffer' pointer. Effectively, the new version of the page will be written in a new location of the file. The old row will be garbage collected, releasing the old volatile information structure, which by itself will release a page reference (see 'SegmentLocator::m referenceCount') on the old segment locator. When it reaches zero, the 'SegmentLocator' object is queued into 'm_fullyEmptySegments' to be reused. See, e.g., 'SegmentLocator::ReleaseRefCount'.

A single logical page (e.g., with the same 'pageId') has three different rows in the 'PageTableRow' table, representing three versions of that logical page. Two versions may refer to the same offset, e.g., 0x1000, and a third version may refer to a different offset, e.g., 0x2000. The different versions of the logical page are referred to, for exemplary description, as Page1, Page1' (Page1(prime)), and Page1" (Page1 (double prime)).

The Page1" version is the most current one, while the other two are expected to be garbage collected by the database system. As 'PageTableRow' rows are garbage collected, the 'pageTableFreeRowResources' callback is invoked which calls 'PageVolatile::Release' and then 'PageVolatile::ReleaseResources' when the page volatile reference count reaches zero. The latter will call 'RBPEXImpl::ReleasePageWithinSegmentLocator' which will decrement the page reference count ('m_referenceCount') within that segment locator.

Continuing the workflow above:

9. As page data is copied to the current 'RbpexWriteBuffer' (see 'm_currentWriteBuffer'), the corresponding state of the page in 'PageTableRow' is changed to 'psInFlight'. In segment mode, the 'psInFlight' state is used for both 'rbpeOnLruRefresh' and 'rbpeWriteFile' and signify that the page is parked in a 'RbpexWriteBuffer' instance waiting for it to fill up and then be written to disk. Only in the completion of that latter step, it will change to 'psValid'.

10. Read operations that find the page in the 'psInFlight' state might be able to be satisfied by reading the page directly from the 'RbpexWriteBuffer' object. This happens at function 'RBPEXImpl::PopulateReadPageInfo' that will call 'RBPEXImpl::GetWriteBufferFromOffset' using the page volatile 'Offset' field of a page that is the 'psInFlight' state. That function can safely find an outstanding 'RbpexWriteBuffer' pointer corresponding to that offset and return a stabilized pointer, a reference is added, to be used by the 'AsyncRead' operation. The 'RbpexWriteBuffer' pointer is easily found because it gets associated with the corresponding 'SegmentLocator' object while the write buffer is in flight.

11. Once the current write buffer object (RbpexWriteBuffer) is full or there are not more work items to process, then the current transaction is committed. This is done by a call to 'RbpexWriteBuffer::CommitTransaction'. Once the commit completes, 'onTransactionComplete' callback will be invoked which calls 'RbpexWriteBuffer::CommitPreparedTransaction'. The latter will move up 'm_pageCountSealed' which indicates the amount of pages that are stable in the write buffer and can be read from it via 'RBPEXImpl::AsyncRead', if necessary. It will also release the corresponding 'RbpexWorkItem' objects which will cause the layer on top to release latches and even evict the corresponding pages from the buffer pool.

12. The commit procedure above can be either eager or lazy. It is eager when at least one affected page was in the 'psValid' state. That means, the layer above will only be communicated once the corresponding log records of the transaction are hardened in storage (e.g., SSD). Notice that the worker threads will not block while waiting for the hardening. That would prevent it to process outstanding 'RbpexWorkItem' efficiently. If an eager commit is needed, then 'HkTransactionPrepare' is called with the 'tpAsynchronous' option and lazy commit is set to 'false'. In that configuration, 'onTransactionComplete' will only be invoked after the log is hardened. But it requires some help to accomplish that as described here:

a. The 'onCreateLogRecord' callback is setup to be called once the log is serialized. See 'RbpexWriteBuffer::CommitTransaction' for details. Since, at that point, there is no more possibility of the transaction to logically fail, any latches acquired up to that point can be released.

b. In asynchronous mode, the system will not try to flush the log by itself. So, a new thread is launched in segment mode to do this flushing: NonCoveredRbpexSegmentModeHost::FlushThreadFn. The 'onCreateLogRecord' callback knows the new 'last LSN' of the transaction that is being committed. It propagates this information to the 'FlushThreadFn' via the member variable 'NonCoveredRbpexSegmentModeHost::m_lsn' using atomic operations to 'IcxMax' and to read it. Then it enqueues the write buffer object into 'm_writeBuffersWaitingHardening' to wait for the hardening.

c. 'NonCoveredRbpexSegmentModeHost::FlushThreadFn' will harden the log using the increasing 'm_lsn' as a guide. Then it will find all write buffer objects that are waiting in 'm_writeBuffersWaitingHardening' with a smaller log sequence number (LSN) than the current flushed LSN and call 'HkTransactionLogWriteCompletion' on the transaction associated with the write buffer. That will end up calling the 'onTransactionComplete' callback.

13. Back on the 'RbpexWriteBuffer::CommitPreparedTransaction' called from the 'onTransactionComplete' callback; after completing the commit, releasing the work items and notifying the callers, the write buffer is technically read to be written to the RBPEX file. This is done via a call to 'RbpexWriteBuffer::StartWriteFileOperationIfComplete'. But that function might decide that the buffer is not full, and that it is too soon to do the writing. In that case, it will put the 'RbpexWriteBuffer' object in the 'm_rbpexWriteBufferPendingList' list which is used by 'StartNewWriteBufferOrResumePendingOne' (see item 4 above) to obtain a new empty write buffer or a pending one.

14. If 'StartWriteFileOperationIfComplete' decides it is time to write the buffer to storage, then it will enqueue the 'RbpexWriteBuffer' object into the 'm_writeBuffersWaitingWriting' list. This will be consumed by yet another segment mode thread: NonCoveredRbpexSegmentModeHost::WriteFileThreadFn. This thread that calls 'RbpeFCB::AsyncWrite' for every write buffer found in that list. Once that write operation completes, then 'onWriteBufferComplete' callback is invoked for every 'RbpexWriteBuffer' object.

15. 'onWriteBufferComplete' callback will invoke 'markPageAsValidAfterWriteCompletion' which will do another transaction to move all involved page rows to the 'psValid' state or delete them in case they got flagged by the eviction routine (See 'RBPEXImpl::DeleteRowsFromSegment'). 'markPageAsValidAfterWriteCompletion' support retries which are done via the 'onWriteBufferCompleteTxComplete' commit completion callback.

16. 'onWriteBufferCompleteTxComplete' is the final callback invoked when the transaction used by 'markPageAsValidAfterWriteCompletion' commits. This final step will do some cleanup activities and update the row page volatile objects with the correct information. Then, finally, the 'RbpexWriteBuffer' will be released for reuse.

The additional examples and embodiments described in this Section may be applicable to examples disclosed in any other Section or subsection of this disclosure.

Embodiments in this description provide for systems, devices, and methods for local page writes via pre-staging buffers for resilient buffer pool extensions. For instance, such a system is described herein. The system includes a program memory that stores program code, and a processing system including one or more processors configured to receive the program code from the program memory and, in response to at least receiving the program code, to perform, or cause to be performed, functions and/or operations. The functions and/or operations include to store data of a write data transaction at a buffer pool memory, update, in a data structure associated with the buffer pool memory, a status for the write data transaction to indicate an in-process state, provide the data to a staging buffer memory for storage thereby from the buffer pool memory, determine that a storage condition has been met for the staging buffer memory, write the data to a buffer pool extension page file, for storage thereby, based at least on the storage condition, and update, in the data structure and subsequent to storage of the data in the buffer pool extension page file, the status for the write data transaction to indicate a completed state and a valid state.

In an embodiment of the system, the data is a data page, and the processing system is configured, in response to at least receiving the program code, to place a lock on the data page in the buffer pool memory prior to said provide the data to the staging buffer memory, determine that said provide the data to the staging buffer memory has reached completion, and release the lock based on the completion and prior to said determine that the storage condition has been met.

In an embodiment of the system, the processing system is configured, in response to at least receiving the program code, to encrypt the data at the staging buffer memory subsequent to said provide the data to the staging buffer memory.

In an embodiment of the system, the processing system is configured, in response to at least receiving the program code, to perform at least one of: receive a read data transaction directed to the data, determine a location of the data, and read the data from the staging buffer memory based at least on the data being located in the staging buffer memory and having the status that indicates the in-process state, or the buffer pool page file memory based at least on the data being located in the buffer pool extension page file and having the status that indicates the completed state and the valid state; or store an updated version of the data for a subsequent write data transaction at the buffer pool memory, and provide the updated data to an instance of the staging buffer memory that does not store the data.

In an embodiment of the system, the data is a data page, the staging buffer memory includes a first instance of the staging buffer memory, and to determine that the storage condition has been met for the staging buffer memory includes at least one of: a determination that the staging buffer memory is full, and a determination of another instance of the staging buffer memory to receive other data of a subsequent write data transaction, or a determination that the data page has been stored in the staging buffer memory for a predetermined period of time.

In an embodiment of the system, the data is a data page, and the staging buffer memory includes a first instance of the staging buffer memory. In the embodiment, the processing system is configured, in response to at least receiving the program code, to: provide the data page to another instance of staging buffer memory in a lock-free operation based at least on the storage condition prior to said provide the data to the buffer pool extension page file.

In an embodiment of the system, the processing system is configured, in response to at least receiving the program code, to evict the data from the buffer pool memory responsive to or subsequent to said provide the data to the staging buffer memory.

A method performed by a computing system is also included herein. The method includes storing data of a write data transaction at a buffer pool memory, updating, in a data structure associated with the buffer pool memory, a status for the write data transaction to indicate an in-process state, providing the data to a staging buffer memory for storage thereby from the buffer pool memory, determining that a storage condition has been met for the staging buffer memory, writing the data to a buffer pool extension page file, for storage thereby, based at least on the storage condition, and updating, in the data structure and subsequent to storage of the data in the buffer pool extension page file, the status for the write data transaction to indicate a completed state and a valid state.

In an embodiment of the method, the data is a data page, and the method further includes placing a lock on the data page in the buffer pool memory prior to said providing the data to the staging buffer memory, determining that said providing the data to the staging buffer memory has reached completion, and releasing the lock based on the completion and prior to said determine that the storage condition has been met.

In an embodiment, the method further includes encrypting the data at the staging buffer memory subsequent to said providing the data to the staging buffer memory.

In an embodiment, the method further includes at least one of: receiving a read data transaction directed to the data, determining a location of the data, and reading the data from the staging buffer memory based at least on the data being located in the staging buffer memory and having the status that indicates the in-process state, or the buffer pool extension page file based at least on the data being located in the buffer pool extension page file and having the status that indicates the completed state and the valid state; or storing an updated version of the data for a subsequent write data transaction at the buffer pool memory, and providing the updated data to an instance of the staging buffer memory that does not store the data.

In an embodiment of the method, the data is a data page, the staging buffer memory includes a first instance of the staging buffer memory, the determining that the storage condition has been met for the staging buffer memory includes at least one of: a determination that the staging buffer memory is full, and a determination of another instance of the staging buffer memory to receive other data of a subsequent write data transaction, or a determination that the data page has been stored in the staging buffer memory for a predetermined period of time.

In an embodiment of the method, the data is a data page, and the staging buffer memory includes a first instance of the staging buffer memory. In the embodiment, the method further includes providing the data page to another instance of staging buffer memory in a lock-free operation based at least on the storage condition prior to said writing the data to the buffer pool extension page file.

In an embodiment, the method further includes evicting the data from the buffer pool memory responsive to or subsequent to said providing the data to the staging buffer memory.

At least one computer readable storage medium having program code recorded thereon that, when executed by at least one processing system, performs a method is also provided. The method includes storing data of a write data transaction at a buffer pool memory, updating, in a data structure associated with the buffer pool memory, a status for the write data transaction to indicate an in-process state, providing the data to a staging buffer memory for storage thereby from the buffer pool memory, determining that a storage condition has been met for the staging buffer memory, writing the data to a buffer pool extension page file, for storage thereby, based at least on the storage condition, and updating, in the data structure and subsequent to storage of the data in the buffer pool extension page file, the status for the write data transaction to indicate a completed state and a valid state.

In an embodiment of at least one computer readable storage medium, the data is a data page, and the method further includes placing a lock on the data page in the buffer pool memory prior to said providing the data to the staging buffer memory, determining that said providing the data to the staging buffer memory has reached completion, and releasing the lock based on the completion and prior to said determine that the storage condition has been met.

In an embodiment of at least one computer readable storage medium, the method further includes encrypting the data at the staging buffer memory subsequent to said providing the data to the staging buffer memory.

In an embodiment of at least one computer readable storage medium, the method further includes at least one of: receiving a read data transaction directed to the data, determining a location of the data, and reading the data from the staging buffer memory based at least on the data being located in the staging buffer memory and having the status that indicates the in-process state, or the buffer pool extension page file based at least on the data being located in the buffer pool extension page file and having the status that indicates the completed state and the valid state; or storing an updated version of the data for a subsequent write data transaction at the buffer pool memory, and providing the updated data to an instance of the staging buffer memory that does not store the data.

In an embodiment of at least one computer readable storage medium, the data is a data page, the staging buffer memory comprises a first instance of the staging buffer memory, and the determining that the storage condition has been met for the staging buffer memory includes at least one of: a determination that the staging buffer memory is full, and a determination of another instance of the staging buffer memory to receive other data of a subsequent write data transaction, or a determination that the data page has been stored in the staging buffer memory for a predetermined period of time.

In an embodiment of at least one computer readable storage medium, the method further includes evicting the data from the buffer pool memory responsive to or subsequent to said providing the data to the staging buffer memory; or the data is a data page, the staging buffer memory comprises a first instance of the staging buffer memory, and the method further includes providing the data page to another instance of staging buffer memory in a lock-free operation based at least on the storage condition prior to said writing the data to the buffer pool extension page file.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
a program memory that stores program code; and
a processing system comprising one or more processors configured to receive the program code from the program memory and, in response to at least receiving the program code, to:
store data of a write data transaction at a buffer pool memory;
update, in a data structure associated with the buffer pool memory, a status for the write data transaction to indicate an in-process state;
provide the data to a staging buffer memory for storage thereby from the buffer pool memory;
determine that a storage condition has been met for the staging buffer memory;
write the data to a buffer pool extension page file, for storage thereby, based at least on the storage condition; and
update, in the data structure and subsequent to storage of the data in the buffer pool extension page file, the status for the write data transaction to indicate a completed state and a valid state.

2. The system of claim 1, wherein the data is a data page; and
wherein the processing system is configured, in response to at least receiving the program code, to:
place a lock on the data page in the buffer pool memory prior to said provide the data to the staging buffer memory;
determine that said provide the data to the staging buffer memory has reached completion; and
release the lock based on the completion and prior to said determine that the storage condition has been met.

3. The system of claim 1, wherein the processing system is configured, in response to at least receiving the program code, to:
encrypt the data at the staging buffer memory subsequent to said provide the data to the staging buffer memory.

4. The system of claim 1, wherein the processing system is configured, in response to at least receiving the program code, to perform at least one of:
receive a read data transaction directed to the data,
determine a location of the data, and
read the data from:
the staging buffer memory based at least on the data being located in the staging buffer memory and having the status that indicates the in-process state, or
the buffer pool extension page file based at least on the data being located in the buffer pool extension page file and having the status that indicates the completed state and the valid state; or
store an updated version of the data for a subsequent write data transaction at the buffer pool memory, and
provide the updated data to an instance of the staging buffer memory that does not store the data.

5. The system of claim 1, wherein the data is a data page; wherein the staging buffer memory comprises a first instance of the staging buffer memory; and wherein said determine that the storage condition has been met for the staging buffer memory includes at least one of:
   a determination that the staging buffer memory is full, and a determination of another instance of the staging buffer memory to receive other data of a subsequent write data transaction; or
   a determination that the data page has been stored in the staging buffer memory for a predetermined period of time.

6. The system of claim 1, wherein the data is a data page;
wherein the staging buffer memory comprises a first instance of the staging buffer memory; and
wherein the processing system is configured, in response to at least receiving the program code, to:
   provide the data page to another instance of staging buffer memory in a lock-free operation based at least on the storage condition prior to said provide the data to the buffer pool extension page file.

7. The system of claim 1, wherein the processing system is configured, in response to at least receiving the program code, to:
   evict the data from the buffer pool memory responsive to or subsequent to said provide the data to the staging buffer memory.

8. A method performed by a computing system, the method comprising:
   storing data of a write data transaction at a buffer pool memory;
   updating, in a data structure associated with the buffer pool memory, a status for the write data transaction to indicate an in-process state;
   providing the data to a staging buffer memory for storage thereby from the buffer pool memory;
   determining that a storage condition has been met for the staging buffer memory;
   writing the data to a buffer pool extension page file, for storage thereby, based at least on the storage condition; and
   updating, in the data structure and subsequent to storage of the data in the buffer pool extension page file, the status for the write data transaction to indicate a completed state and a valid state.

9. The method of claim 8, wherein the data is a data page; the method further comprising:
   placing a lock on the data page in the buffer pool memory prior to said providing the data to the staging buffer memory;
   determining that said providing the data to the staging buffer memory has reached completion; and
   releasing the lock based on the completion and prior to said determine that the storage condition has been met.

10. The method of claim 8, further comprising:
encrypting the data at the staging buffer memory subsequent to said providing the data to the staging buffer memory.

11. The method of claim 8, further comprising at least one of:
receiving a read data transaction directed to the data, determining a location of the data, and
reading the data from:
   the staging buffer memory based at least on the data being located in the staging buffer memory and having the status that indicates the in-process state, or
   the buffer pool extension page file based at least on the data being located in the buffer pool extension page file and having the status that indicates the completed state and the valid state; or
storing an updated version of the data for a subsequent write data transaction at the buffer pool memory, and providing the updated data to an instance of the staging buffer memory that does not store the data.

12. The method of claim 8, wherein the data is a data page;
wherein the staging buffer memory comprises a first instance of the staging buffer memory; and
wherein said determining that the storage condition has been met for the staging buffer memory includes at least one of:
   a determination that the staging buffer memory is full, and a determination of another instance of the staging buffer memory to receive other data of a subsequent write data transaction; or
   a determination that the data page has been stored in the staging buffer memory for a predetermined period of time.

13. The method of claim 8, wherein the data is a data page;
wherein the staging buffer memory comprises a first instance of the staging buffer memory;
the method further comprising:
   providing the data page to another instance of staging buffer memory in a lock-free operation based at least on the storage condition prior to said writing the data to the buffer pool extension page file.

14. The method of claim 8, further comprising:
evicting the data from the buffer pool memory responsive to or subsequent to said providing the data to the staging buffer memory.

15. At least one computer readable storage medium having program code recorded thereon that, when executed by at least one processing system, performs a method comprising:
   storing data of a write data transaction at a buffer pool memory;
   updating, in a data structure associated with the buffer pool memory, a status for the write data transaction to indicate an in-process state;
   providing the data to a staging buffer memory for storage thereby from the buffer pool memory;
   determining that a storage condition has been met for the staging buffer memory;
   writing the data to a buffer pool extension page file, for storage thereby, based at least on the storage condition; and
   updating, in the data structure and subsequent to storage of the data in the buffer pool extension page file, the status for the write data transaction to indicate a completed state and a valid state.

16. The at least one computer readable storage medium of claim 15, wherein the data is a data page;
the method further comprising:
   placing a lock on the data page in the buffer pool memory prior to said providing the data to the staging buffer memory;
   determining that said providing the data to the staging buffer memory has reached completion; and
   releasing the lock based on the completion and prior to said determine that the storage condition has been met.

17. The at least one computer readable storage medium of claim 15, wherein the method further comprises:
    encrypting the data at the staging buffer memory subsequent to said providing the data to the staging buffer memory.

18. The at least one computer readable storage medium of claim 15, wherein the method further comprises at least one of:
    receiving a read data transaction directed to the data, determining a location of the data, and
    reading the data from:
        the staging buffer memory based at least on the data being located in the staging buffer memory and having the status that indicates the in-process state, or
        the buffer pool extension page file based at least on the data being located in the buffer pool extension page file and having the status that indicates the completed state and the valid state; or
    storing an updated version of the data for a subsequent write data transaction at the buffer pool memory, and
    providing the updated data to an instance of the staging buffer memory that does not store the data.

19. The at least one computer readable storage medium of claim 15, wherein the data is a data page;
    wherein the staging buffer memory comprises a first instance of the staging buffer memory; and
    wherein said determining that the storage condition has been met for the staging buffer memory includes at least one of:
        a determination that the staging buffer memory is full, and a determination of another instance of the staging buffer memory to receive other data of a subsequent write data transaction; or
        a determination that the data page has been stored in the staging buffer memory for a predetermined period of time.

20. The at least one computer readable storage medium of claim 15, wherein:
    the method further comprises evicting the data from the buffer pool memory responsive to or subsequent to said providing the data to the staging buffer memory; or
    the data is a data page;
    the staging buffer memory comprises a first instance of the staging buffer memory;
    the method further comprising:
        providing the data page to another instance of staging buffer memory in a lock-free operation based at least on the storage condition prior to said writing the data to the buffer pool extension page file.

* * * * *